No. 667,556. Patented Feb. 5, 1901.
E. McJOHN.
BICYCLE LOCK.
(Application filed Oct. 22, 1900.)
(No Model.)
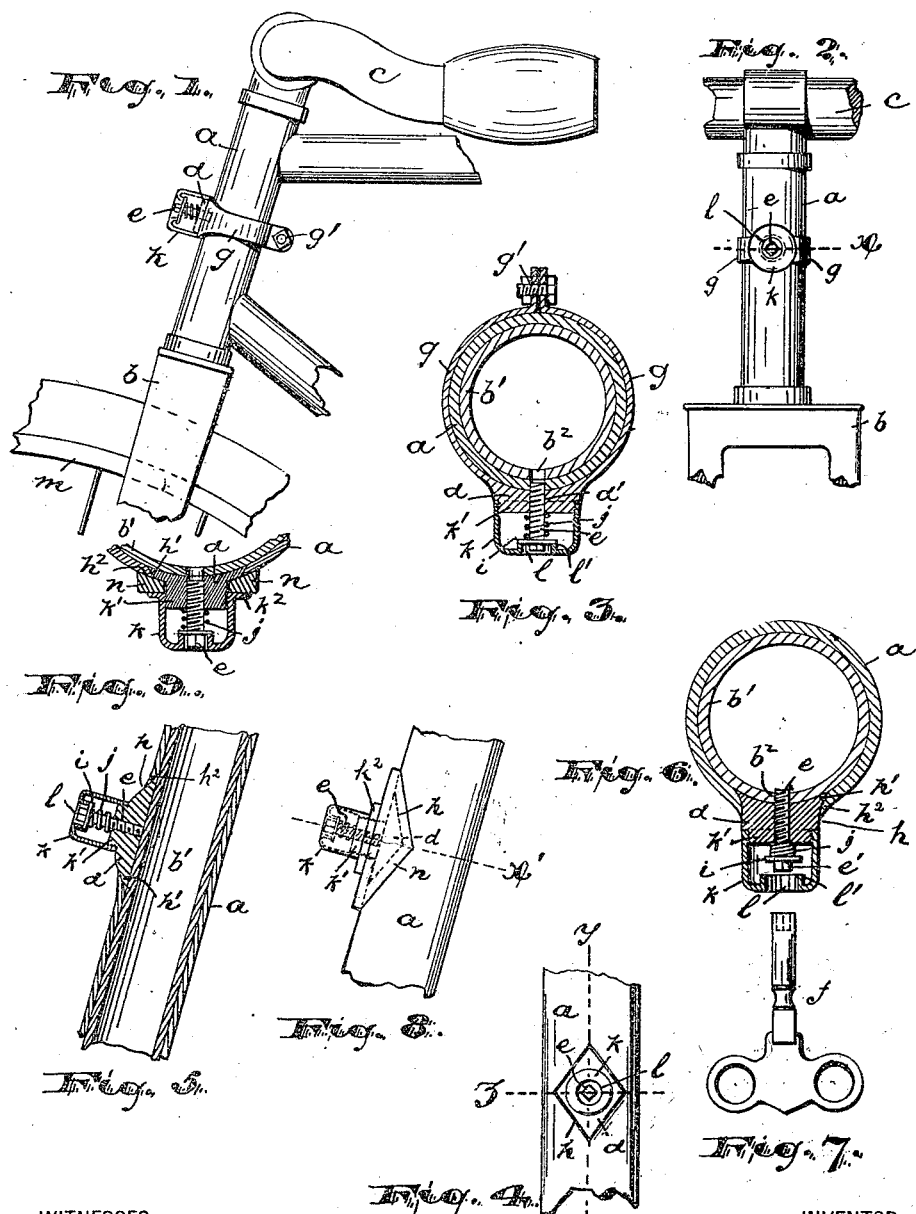
WITNESSES:
Henry Krug
Russell M. Everett
INVENTOR:
Edward McJohn,
BY
Drake & Co.
ATTORNEYS.

UNITED STATES PATENT OFFICE.

EDWARD McJOHN, OF NEWARK, NEW JERSEY.

BICYCLE-LOCK.

SPECIFICATION forming part of Letters Patent No. 667,556, dated February 5, 1901.

Application filed October 22, 1900. Serial No. 33,834. (No model.)

*To all whom it may concern:*

Be it known that I, EDWARD McJOHN, a citizen of the United States, residing at Newark, in the county of Essex and State of New Jersey, have invented certain new and useful Improvements in Bicycle-Locks; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a lock for bicycles which shall prevent the wheel being ridden by unauthorized parties, to provide such a lock which can be either applied to finished wheels or built into a new wheel, to secure simplicity, neatness of appearance, and efficiency, and to obtain other advantages and results, some of which may be referred to hereinafter in connection with the description of the working parts.

The invention consists in the improved bicycle-lock herein described and in the arrangements and combinations of parts of the same, all substantially as will be hereinafter set forth and finally embraced in the clauses of the claim.

Referring to the accompanying drawings, in which like letters of reference indicate corresponding parts in each of the several views, Figure 1 shows in side view a portion of a bicycle with my improved lock as applied thereto after the bicycle is completed. Fig. 2 is a front view of the same; and Fig. 3 is a transverse section, on an enlarged scale, taken through line $x$, Fig. 2. Fig. 4 is a front view showing the lock as applied to a bicycle in building. Figs. 5 and 6 are longitudinal and transverse sections, respectively, taken on lines $y$ and $z$ of Fig. 4. Fig. 7 shows the key for operating the lock. Fig. 8 is a side elevation illustrating the use of a certain washer hereinafter described; and Fig. 9 is a section of the same on line $x'$, Fig. 8.

In said drawings, $a$ indicates the inclined sleeve at the front of a bicycle, which receives the post $b'$ of the fork $b$, said post being turned freely in said sleeve by the handle-bars $c$ to steer the bicycle. To the outer surface of said sleeve in carrying out my invention I apply a projecting block $d$, of metal, which forms a central socket $d'$ for the lock-bolt $e$, hereinafter described, and at its front a seat for an inclosing cap $k$. This block $d$ I may attach to a completed bicycle by providing it with lateral arms $g$, adapted to clasp around the sleeve and be clamped together at their ends by a bolt or screw $g'$. In applying the lock in the course of manufacture of the bicycle, however, an aperture $h$, with undercut walls, may be cut in the wall of the sleeve $a$ and thin projecting edges $h'$ formed on the block to lie in the aperture, as illustrated in Figs. 4 to 7. In this latter construction the aperture $h$ and base of the block are of an angular shape, preferably diamond-shaped, to prevent turning.

The central socket $d'$ of the block $d$ is threaded, and the correspondingly-threaded lock-bolt $e$ works therein, said lock-bolt passing through the wall of the sleeve $a$ and at its inner extremity either abutting against the rotary post $b'$ or entering a recess $b^2$, therein, according to the relative position of post and sleeve. The recess is so located that when the lock-bolt enters therein the wheels of the bicycle will be in alinement, and in any other position of the wheels the lock-bolt can be screwed against the post tight enough to prevent the bicycle being ridden.

The head of the lock-bolt is made angular, as at $e'$, to receive a key $f$, whereby the bolt is turned into locked or unlocked position, and below said head is a peripheral flange $i$ of considerably larger diameter. Between said flange and the block $d$ is a spiral spring $j$, coiled around the lock-bolt and producing sufficient friction of the lock-bolt in its threaded socket to prevent its movement by jarring or the like.

The inclosing cap $k$, above referred to, is screwed or otherwise secured at its open end to the seat $k'$, provided at the front of the block $d$, the said cap inclosing and surrounding the lock-bolt, as shown. The outer end of the cap $k$ is centrally perforated, as at $l$, and a flange $l'$ projects inward from around said perforation, forming a cylindrical entrance for the key $f$ to be applied to the lock-bolt. The cap $k$ thus prevents access to the lock-bolt by any other means than the properly-fitted key, and, moreover, in outward screwing of the lock-bolt the flange $i$ of the bolt engages the flange $l'$ of the cap and the unlocking of the bolt is limited. The head of the lock-bolt, it will be observed, is never exposed beyond the cap $k$. In use, therefore, of my improved lock the rider when he dismounts to leave his bicycle clamps the lock-bolt $e$ firmly against the post $b'$ or into the recess therein. In this condition the post $b'$, fork $b$, and front wheel $m$ cannot be turned to steer the bicycle, and hence it is impossible to ride the bicycle, and it can be stolen only by being carried off bodily.

In the construction to which I have referred as applicable to bicycles in building it may under some conditions be desirable to secure greater strength by the means illustrated in Figs. 8 and 9. Here a washer $n$ is applied to the outside of the tubular sleeve $a$, said washer passing loosely over the front end or seat $k'$ of the block $d$ and being suitably curved or shaped at its inner surface to lie against the sleeve $a$ around the edges of the aperture $h$. The cap $k$ is then screwed onto the part $k'$ tightly against the washer $n$, thereby gripping the edges $h^2$ around the aperture $h$ firmly between the flange $h'$ of the block on the inside and the washer $n$ on the outside. The outer face of the washer $n$ preferably is flat, and the cap $k$ may have a rim $k^2$ engaging said face of the washer.

Having thus described the invention, what I claim as new is—

1. The combination with a bicycle having the apertured sleeve $a$, and post $b'$, therein, of the block $d$, having a head or flange held in the aperture and a portion $k'$, projecting outside the sleeve, and being perforated at right angles to the sleeve and interiorly threaded, a lock-bolt $e$, exteriorly threaded and working in the said perforation of the block and adapted to be screwed against the outer surface of the post $b'$, to clamp the same against turning in the sleeve, a cap $k$, secured to the projecting portion $k'$, of the block and inclosing the end of the lock-bolt and having a keyhole in line therewith, and a flange on the lock-bolt adapted to close said keyhole when the parts are in unlocked position, substantially as set forth.

2. The combination with a bicycle having the sleeve $a$, and post $b'$, of a block $d$, secured to said sleeve and having an interiorly-screw-threaded perforation at right angles to the post and opening at its inner end against the post, a lock-bolt correspondingly threaded to screw in said perforated block and be thus clamped against the post $b'$, at any point of its circumference, a cap or lock-case inclosing the outer end of the lock-bolt and having a key-opening in line therewith, and an annular flange on the lock-bolt back from its key-receiving end and adapted to cover the key-opening when the bolt is unscrewed from the post $b'$, and close said key-opening against dust and the like while the bicycle is running, substantially as set forth.

3. The combination with a bicycle having the sleeve $a$, and post $b'$, of a block $d$, fixed to said sleeve and having a threaded socket, a threaded lock-bolt working in said socket and adapted to engage at its inner end the post, the outer end of said bolt having a peripheral flange and an angular head, a cap $k$, secured to the block $d$, and inclosing the lock-bolt, said cap being apertured at its outer end in alinement with the lock-bolt, and having an interior stop limiting outward movement of the lock-bolt, and a key adapted to be inserted through the aperture in the cap and clutch the head of the lock-bolt, substantially as set forth.

4. The combination in a bicycle, of the apertured sleeve $a$, the perforated block $d$, having a head or flange lying in the sleeve and a portion $k'$, projecting through the aperture, a washer $n$, placed over said projecting portion of the block and adapted to lie against the outer surface of the sleeve, a screw-bolt $e$, working in the perforated block $d$, and a hollow cap $k$, screwed upon the projecting end $k'$, of the block $d$, against the washer $n$, at its inner end and at its outer end limiting outward movement of the bolt and having a key-aperture providing access to the said bolt, substantially as set forth.

5. In a bicycle, the combination with the sleeve $a$, and post $b'$, turning therein, of a block $d$, secured to the sleeve and providing a threaded socket, a lock-bolt $e$, screwing in said socket and adapted to engage at its inner end the post $b'$, the outer end of said bolt having a flange or stop, and a hollow cap secured to the block $d$, and inclosing the outer end of the lock-bolt, and at its outer end being perforated and having a reëntrant tubular key-passage engaging at its inner end the flange or stop on the lock-bolt, substantially as set forth.

In testimony that I claim the foregoing I have hereunto set my hand this 13th day of October, 1900.

EDWARD McJOHN.

Witnesses:
WILLIAM McBRIDE,
W. EDWARD WARD.